Jan. 17, 1928.

W. A. SMITH

BLOWING DEVICE

Filed Oct. 12, 1926

1,656,540

INVENTOR.
William A. Smith.
BY Herbert G. Ogden
HIS ATTORNEY.

Patented Jan. 17, 1928.

1,656,540

UNITED STATES PATENT OFFICE.

WILLIAM A. SMITH, OF SAYRE, PENNSYLVANIA, ASSIGNOR TO INGERSOLL-RAND COMPANY, OF JERSEY CITY, NEW JERSEY, A CORPORATION OF NEW JERSEY.

BLOWING DEVICE.

Application filed October 12, 1926. Serial No. 141,151.

This invention relates to rock drills, but more particularly to a blowing device for fluid actuated rock drills of the hammer type.

The objects of the invention are to selectively admit an uninterrupted flow of pressure fluid through the rock drill and the drill steel into the drill hole for blowing the cuttings therefrom and to enable such blowing to be accomplished without shutting off the supply of pressure fluid required for normally operating the drill.

Other objects will appear hereinafter.

Figure 1:
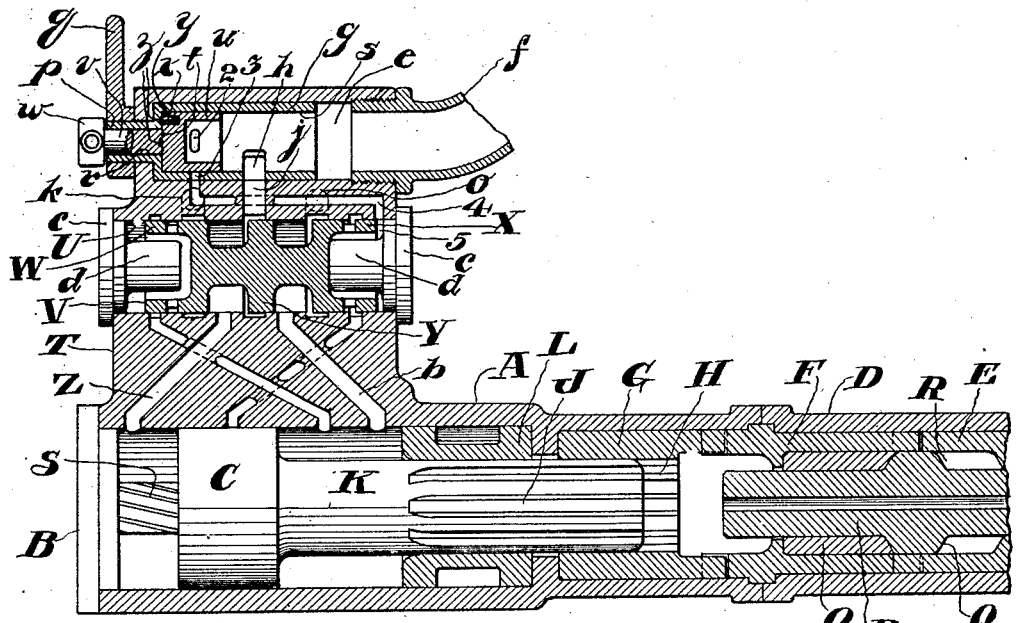
Figure 2:
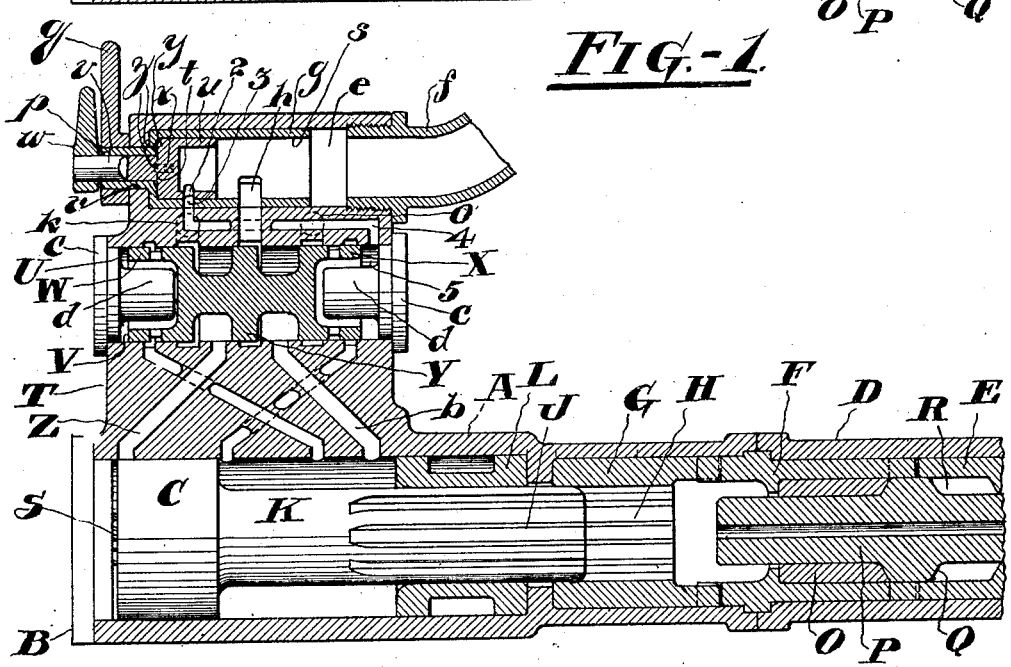

In the drawings illustrating one embodiment which the invention may assume in practice, Figure 1 is a longitudinal sectional elevation of a rock drill having the invention applied thereto, and Figure 2 is a similar view showing the position of the parts during the blowing operation.

Referring to the drawings, A represents a cylinder closed at its rearward end by a head B and being provided with a reciprocatory hammer piston C. A front head D abuts the front end of the cylinder A and may be attached thereto in operative position in any suitable manner, preferably by the usual spring pressed side bolts (not shown). The front head D and the front end of the cylinder A form a housing for the chuck mechanism comprising in this instance, a chuck jaw E in the front end of the front head, a chuck F interlocked with the chuck jaw E and a chuck nut G interlocked with the chuck F, said chuck nut being provided with inwardly extending ribs H which interlock slidably with flutes J formed in an extension K of the piston C. A bushing L disposed in the cylinder A forms a closure for the front end of the cylinder and is bored to receive slidably the piston extension K.

Disposed within the chuck F is a chuck bushing O which acts as a guide for a hollow drill steel P extending with its rearward end into the path of the piston C. The drill steel P in this instance is provided with wings Q which interlock with flat portions R formed in the chuck jaw E for imparting the rotary movement of the chuck mechanism to the drill steel P. A rifle bar S of a well known type interlocks slidably with the piston C in the usual manner for rotating the drill steel.

A valve chest T shown in this instance as being formed integrally with the cylinder A has a valve chamber U in which is disposed a pressure fluid distributing valve V of the type described in detail in United States Patent No. 1,589,255, entitled Rock drill spool valve and granted to William A. Smith, June 15, 1926. The valve accordingly has outer heads W and X and a central head Y for distributing pressure fluid to the rearward and front ends of the cylinder through inlet passages Z and $b$ respectively. Suitable closures are provided for the ends of the valve chamber in the form of plugs $c$ having inwardly extending projections $d$ which act as abutments or stops for the valve V.

Pressure fluid for operating the drill is in this instance conveyed to a supply chamber $e$ on the valve chest T through a suitable connection $f$ leading from a source of pressure fluid supply (not shown). The admission of such pressure fluid to the valve chamber U is controlled by a throttle valve $g$ disposed in this instance rotatably in the supply chamber $e$. A port $h$ in the throttle valve $g$ is adapted to register with a port $j$ intermediate the ends of the valve chamber U and controlled by the central head Y of the valve V. The outer heads W and X of the valve in this instance controlling main exhaust ports $k$ and $o$ leading from the valve chamber U to the atmosphere.

In accordance with the present invention, a reduced extension $p$ of the throttle valve $g$ to which the controlling lever $q$ is secured is provided with a bore $r$ of smaller diameter than the bore $s$ of the throttle valve $g$ to form a shoulder $t$ at the juncture of the bores $s$ and $r$. Disposed within the throttle valve $g$ is a blower valve $u$ having a stem $v$ extending through the bore $r$ of the throttle valve $g$. On the outer end of the stem $v$ is secured a controlling lever $w$ for rotating the blower valve. The lever $w$ is preferably spaced a sufficient distance from the end of the extension $p$ to permit limited longitudinal movement of the blower valve $u$ in an inwardly direction for the purpose of avoiding excessive friction between the cooperating end surfaces of the blower valve and the throttle valve during rotation of the blower valve.

Means are provided for holding the blower valve in placed position with respect to the throttle valve $g$. To this end a pin $x$ is disposed fixedly in the end $y$ of the blower valve. Only a small portion of this pin $x$ projects from the end $y$ to engage depressions $z$ formed in the shoulder $t$ in convenient positions for holding the blower valve in its closed and open positions.

Formed in the blower valve $u$ is a port 2 adapted to register with a port 3 in the throttle valve $g$ and both of these ports 2 and 3 are positioned to register with a passage 4 leading from the supply chamber $e$ to a pressure chamber 5 in the front end of the valve chamber U.

During the normal operation of the drill, a certain small portion of the pressure fluid entering the front end of the cylinder passes along the fluted extension K of the piston C through the drill steel P into the drill hole and, to some extent, serves to remove or blow out some of the dust and cuttings from the drill hole. Owing to the short duration of such blowing and the consequent amount of pressure fluid thus admitted to the drill hole, a considerable accumulation of cuttings is formed rearwardly of the cutting bit of the drill steel. Such cuttings if not removed will greatly retard the action of the drill and in time will form a cushion beneath the drill bit, so that instead of cutting on a fresh or clean rock face, the drill will strike against the cuttings. In order to prevent this objectionable condition the attendant may, while the throttle valve $g$ is in its open position, rotate the blower valve $u$ to bring the port 2 into registry with the port 3 in the throttle valve and thus admit pressure fluid from the supply chamber $e$ through the passage 4 to the pressure chamber 5 in the valve chamber U.

Upon the admission of pressure fluid to the pressure chamber 5 the valve V will be moved rearwardly to the position illustrated in Figure 2. With the valve V in this position a constant supply of pressure fluid may flow directly from the supply chamber $e$ through the ports $h$ and $j$ and through the valve chamber between the heads Y and X, thence through the front inlet passage $b$ into the front end of the cylinder A.

It will be observed that when the valve V is in its rearwardmost position the rearward end of the cylinder will be opened to the atmosphere through the inlet passage Z, the valve chamber U and the main exhaust port $k$. The piston C will then be moved to the rearward end of the cylinder by the pressure fluid flowing into the front end of the cylinder, thus drawing the fluted extension K into the front end of the cylinder to allow pressure fluid to flow through flutes J, through the drill steel P and into the drill hole.

After the drill hole has been thoroughly cleansed the blower valve $u$ may again be rotated to its closed position where it will be held against accidental rotation by the pressure fluid acting against the inner end of the blower valve. In this way also the pin $x$ will be held in engagement with the depressions $z$.

I claim:

1. In a fluid actuated rock drill, the combination of a cylinder having inlet passages, a reciprocatory hammer piston in the cylinder, a fluted extension on the piston, a valve chest having a valve chamber, a distributing valve in the valve chamber controlling the inlet passages, a supply chamber on the valve chest constantly exposed to pressure fluid from a source of supply, a passage leading from the supply chamber to an end of the valve chamber, and a valve in the supply chamber controlling the passage for selectively admitting pressure fluid under full line pressure from the supply chamber to one end of the valve chamber whereby the distributing valve is held immovable in the opposite end of the valve chamber, thus permitting an uninterrupted flow of pressure fluid from the valve chamber through an inlet passage into the cylinder and through the front end thereof.

2. In a fluid actuated rock drill, the combination of a cylinder having inlet passages, a reciprocatory hammer piston in the cylinder, a fluted extension on the piston, a valve chest having a valve chamber, a distributing valve in the valve chamber controlling the inlet passages, a supply chamber on the valve chest constantly exposed to pressure fluid from a source of supply, a passage leading from the supply chamber to the front end of the valve chamber, and a blower valve rotatable in the supply chamber controlling the passage for selectively admitting pressure fluid to the front end of the valve chamber whereby the distributing valve is held immovable in the rearward end of the valve chamber, thus directing an uninterrupted flow of pressure fluid from the valve chamber through an inlet passage to the front end of the cylinder and through the flutes of the extension.

3. In a fluid actuated rock drill, the combination of a cylinder having front and rear inlet passages, a hammer piston in the cylinder, a fluted extension on the piston, a valve chest having a valve chamber, a distributing valve in the valve chamber controlling the inlet passages, a supply chamber on the valve chest constantly exposed to pressure fluid from a source of supply, a throttle valve in the supply chamber controlling the admission of pressure fluid from the supply chamber to the valve chamber, a passage leading from the supply chamber to the front end of the valve chamber, and a blower valve rotatable in the throttle valve for selectively admitting pressure fluid through the passage to the front end of the valve chamber to hold the distributing valve immovable in the rearward end of said valve chamber while the throttle valve is open, thus permitting an uninterrupted flow of pressure fluid from the valve chamber through the front inlet passage into the front end of the cylinder and through the flutes in the extension.

In testimony whereof I have signed this specification.

WILLIAM A. SMITH.